United States Patent
Sumida et al.

(10) Patent No.: US 7,973,880 B2
(45) Date of Patent: Jul. 5, 2011

(54) ILLUMINATION DEVICE AND LIQUID CRYSTAL DISPLAY DEVICE

(75) Inventors: Yukihiro Sumida, Nara (JP); Takeshi Masuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 122 days.

(21) Appl. No.: 11/991,255

(22) PCT Filed: Aug. 3, 2006

(86) PCT No.: PCT/JP2006/315412
§ 371 (c)(1),
(2), (4) Date: Feb. 29, 2008

(87) PCT Pub. No.: WO2007/029433
PCT Pub. Date: Mar. 15, 2007

(65) Prior Publication Data
US 2009/0257001 A1 Oct. 15, 2009

(30) Foreign Application Priority Data
Sep. 2, 2005 (JP) .................................. 2005-255276

(51) Int. Cl.
*G02F 1/13357* (2006.01)
*F21V 8/00* (2006.01)

(52) U.S. Cl. ........... 349/65; 362/330; 362/616; 362/627

(58) Field of Classification Search .......................... None
See application file for complete search history.

(56) References Cited

U.S. PATENT DOCUMENTS

| 5,764,322 | A | 6/1998 | Mamiya et al. |
| 6,243,524 | B1 * | 6/2001 | Funabashi ..................... 385/129 |
| 6,642,976 | B2 | 11/2003 | Umemoto et al. |
| 6,667,782 | B1 | 12/2003 | Taira et al. |
| 6,796,669 | B2 | 9/2004 | Masuda |
| 2002/0005922 | A1 | 1/2002 | Umemoto et al. |
| 2002/0158853 | A1 * | 10/2002 | Sugawara et al. ............. 345/176 |
| 2003/0043315 | A1 | 3/2003 | Umemoto et al. |
| 2004/0022050 | A1 * | 2/2004 | Yamashita et al. ............. 362/31 |
| 2006/0055850 | A1 | 3/2006 | Murata et al. |
| 2006/0056196 | A1 | 3/2006 | Masuda |

FOREIGN PATENT DOCUMENTS

| JP | 9-5739 | 1/1997 |
| JP | 10-020125 | 1/1998 |
| JP | 10-142601 | 5/1998 |
| JP | 2001-110218 | 4/2001 |

(Continued)

OTHER PUBLICATIONS

International Search Report for PCT/JP2006/315412 mailed Nov. 7, 2006.

*Primary Examiner* — Omar Rojas
(74) *Attorney, Agent, or Firm* — Nixon & Vanderhye P.C.

(57) ABSTRACT

A transparent substrate 2, into which light from a light source 9 is introduced through at least one side, includes a transparent first glass substrate (substrate body) 5a and a low refractive index layer 6 that is disposed on the first glass substrate 5a and has a lower refractive index than the first glass substrate 5a. Moreover, a high refractive index layer 7 having a higher refractive index than the low refractive index layer 6 is disposed on the low refractive index layer 6, thereby preventing the generation of light that leaks from the first glass substrate 5a to the outside through the low refractive index layer 6.

15 Claims, 12 Drawing Sheets

FOREIGN PATENT DOCUMENTS

| | | |
|---|---|---|
| JP | 2001-318379 | 11/2001 |
| JP | 2002-121050 | 4/2002 |
| JP | 2003-66444 | 3/2003 |
| JP | 2003-257227 | 9/2003 |
| JP | 2006-84809 | 3/2006 |
| WO | 2004/042273 | 5/2004 |

* cited by examiner

ILLUMINATION DEVICE AND LIQUID CRYSTAL DISPLAY DEVICE

This application is the U.S. national phase of International Application No. PCT/JP2006/315412 filed 3 Aug. 2006 which designated the U.S. and claims priority to Japanese Patent Application No. 2005-255276 filed 2 Sep. 2005, the entire contents of each of which are hereby incorporated by reference.

TECHNICAL FIELD

The present invention relates to a transparent substrate into which light is introduced, and an illumination device and a liquid crystal display device that use the transparent substrate.

BACKGROUND ART

In recent years, liquid crystal display devices characterized by low power consumption, thinness, and light weight have been used as display devices of a TV, a personal computer, a mobile phone, etc. Such a liquid crystal display device does not emit light by itself, which is a so-called non-luminous display device, and therefore is designed to direct light from an illumination device (backlight) that is provided, e.g., on the back (non-display surface) side of a liquid crystal display element or ambient light onto the liquid crystal display element as illumination light. In the liquid crystal display device, the intensity of the illumination light is modulated by controlling the transmittance or reflectance of the liquid crystal display element in accordance with image signals so as to display images.

The above backlight is broadly divided into a direct type and a sidelight type depending on the location of a light source with respect to the liquid crystal display element. For the direct-type backlight, a plurality of light sources are located directly on the back side of the liquid crystal display element, and a diffuser or a focusing prism sheet is interposed between the light sources and the liquid crystal display element, thereby allowing uniform illumination light to enter the liquid crystal display element.

On the other hand, the sidelight-type backlight includes a light source located on the side of the liquid crystal display element and a light guide located with its side facing the light source. Light from the light source is introduced into the light guide directly through the side or via a reflector. In this sidelight-type backlight, while the light introduced into the light guide is propagated by total reflection inside the light guide, the light from the light source is emitted to the liquid crystal display element as illumination light appropriately by using patterns or the like provided on the surface, back or inside of the light guide. Moreover, the sidelight-type backlight generally includes several diffusion sheets or focusing prism sheets to improve the uniformity of light emitted from the light guide.

The above patterns of the sidelight-type backlight may be provided in the following manner: a resin for diffusing light is printed on the surface of the light guide; concave and convex portions for disusing light are formed in the surface of the light guide; particles for diffusing light are filled into the light guide; or prism-shaped structures are integrally molded with the light guide. The sidelight-type backlight can emit uniform planar light by forming the patterns so that the density varies with distance from the light source.

The direct-type backlight has the advantages of being able to achieve light weight and high brightness easily. Therefore, the direct-type backlight is used as an illumination device for a liquid crystal television with a relatively large screen size or a vehicle-mounted liquid crystal display device. For portable equipment with a relatively small screen size such as a mobile phone, PDA, or notebook PC, the sidelight-type backlight is mainly used because of its advantages of relatively low power consumption, thin, lightweight, and high brightness uniformity.

There has been a demand to further reduce the thickness and weight of the liquid crystal display device. However, it is difficult for the existing direct-type backlight and sidelight-type backlight, which requires a light guide and diffusion sheets or focusing prism sheets, to meet this demand. In the conventional liquid crystal display device, therefore, it has been proposed that a transparent substrate is used as one of a pair of substrates sandwiching a liquid crystal layer included in the liquid crystal display element, and light from the light source is introduced into the transparent substrate, so that the light guide can be removed (see, e.g., JP 9 (1997)-5739 A).

A liquid crystal display device of a first conventional example disclosed in JP 9 (1997)-5739 A will be described specifically with reference to FIG. 11.

As shown in FIG. 11, the liquid crystal display device of the first conventional example includes a liquid crystal layer 31, a pair of transparent substrates 32a, 32b sandwiching the liquid crystal layer 31, and a light guiding sheet 33 attached to the opposite surface of the transparent substrate 32a from the liquid crystal layer 31. A light source 35 and a reflector 36 are located on the left side of the transparent substrate 32a and the light guiding sheet 33, and light from the light source 35 is introduced into the transparent substrate 32a and the light guiding sheet 33. The transparent substrates 32a, 32b are made of a transparent glass material having a refractive index of 1.60. The light guiding sheet 33 has a refractive index of 1.62 to 1.65 higher than that of the transparent substrate 32a.

In the light guiding sheet 33, two or more types of transparent amorphous layers are stacked at a predetermined angle. The light incident from the light source 35 onto the transparent substrate 32a is reflected by an interface 34 between the two amorphous layers with different refractive indexes, and directed toward a first polarizer 37 and a reflector 38 that are located in this order on the lower side of the light guiding sheet 33. Moreover, of s-polarized light and p-polarized light contained in the light from the light source 35, the light guiding sheet 33 emits mainly the s-polarized light selectively to the reflector 38.

In the liquid crystal display device of the first conventional example with the above configuration, the light introduced from the light source 35 into each of the transparent substrate 32a and the light guiding sheet 33 is propagated through the light guiding sheet 33 in the direction away from the light source 35 while being totally reflected by utilizing the refractive index difference between the light guiding sheet 33 and the air and the refractive index difference between the light guiding sheet 33 and the transparent substrate 32a. When the total reflection conditions of the light traveling in the light guiding sheet 33 are not fulfilled by the presence of the interfaces 34 in the light guiding sheet 33, the s-polarized light is emitted to the reflector 38, and then is reflected from the reflector 38 to the light guiding sheet 33. Subsequently, the light reflected back to the light guiding sheet 33 enters the liquid crystal display element as illumination light, and passes through a second polarizer 39 provided on the upper surface of the transparent substrate 32b, so that images are displayed with the liquid crystal display element.

However, in this liquid crystal display device of the first conventional example, the light from the light source 35 is mainly propagated through the light guiding sheet 33. Therefore, to use the light from the light source 35 efficiently, the thickness of the light guiding sheet 33 should be at least about the same as that of the light source 35. Thus, the advantages of reduced thickness and weight may be impaired compared to other conventional liquid crystal display devices including the light guide. Although the transparent substrates 32a, 32b themselves can be made thinner to reduce the thickness and weight of the liquid crystal display device, the use of a thinner glass material for each of the transparent substrates 32a, 32b may cause new problems such as breakage of the glass material (cracking, glass chipping, etc.) during the manufacturing process. Accordingly, there is a limit to the reduction in thickness and weight of the liquid crystal display device of the first conventional example.

Moreover, in this liquid crystal display device of the first conventional example, the light from the light source 35 is extracted at each of the interfaces 34 in the light guiding sheet 33 and used as illumination light. However, since the reflectance of the interfaces 34 is very low, the light traveling in the light guiding sheet 33 cannot be efficiently emitted as illumination light.

In particular, when a light absorbing layer with relatively high light absorption properties such as a color filter or metal wiring is provided in the liquid crystal display element, the amount of illumination light absorbed by the light absorbing layer is increased because the refractive index difference between the transparent substrate 32a and the light guiding sheet 33 is small (0.02 to 0.05). This may lead to a significant reduction in the light utilization efficiency of the light source 35.

In the conventional liquid crystal display device, therefore, it has been proposed that a low refractive index layer is disposed on one side of the transparent substrate serving as the light guide that faces the liquid crystal layer, and an optical path control layer is disposed on the other side of the transparent substrate that faces away from the liquid crystal layer. This configuration is intended to reduce the thickness and weight of the liquid crystal display device and also to prevent a reduction in the light utilization efficiency (see, e.g., JP 2001-318379 A and JP 2002-121050 A).

Specifically, as shown in FIG. 12, a liquid crystal display device of a second conventional example disclosed in JP 2001-318379 A includes a liquid crystal layer 49, a pair of transparent substrates 44a, 44b sandwiching the liquid crystal layer 49, and a light source 51 located opposite to the side of the transparent substrate 44a. Light from the light source 51 is introduced into the transparent substrate 44a directly and via a reflector. The liquid crystal display device of the second conventional example is a reflection-type liquid crystal display device in which reflected light from a reflector 50 provided on the transparent substrate 44b is allowed to enter the liquid crystal display element as illumination light.

The transparent substrates 44a, 44b are made of a transparent glass material. A transparent low refractive index layer 45 having a lower refractive index than the transparent substrate 44a is disposed on the surface of the transparent substrate 44a that faces the liquid crystal layer 49. Moreover, a color filter 46, a transparent electrode 47a, and an alignment film 48a are disposed between the low refractive index layer 45 and the liquid crystal layer 49. The reflector 50 is disposed on the surface of the transparent substrate 44b that faces the liquid crystal layer 49, and a transparent electrode 47b and an alignment film 48b are disposed between the liquid crystal layer 49 and the reflector 50.

On the other hand, a phase retarder 43, a polarizer 42, and an optical path control layer 41 are disposed in this order on the opposite surface of the transparent substrate 44a from the liquid crystal layer. The optical path control layer 41 has a higher refractive index than the low refractive index layer 45 and is provided with slopes at an angle of 35 to 48°. In the liquid crystal display device of the second conventional example, the light introduced from the light source 51 into the transparent substrate 44a is propagated in the direction away from the light source 51 by repeating total reflection between the optical path control layer 41 and the transparent substrate 44a due to the refractive index difference between the transparent substrate 44a and the low refractive index layer 45 and the refractive index difference between the optical path control layer 41 and the air. Moreover, when the total reflection conditions are not fulfilled by the presence of the slopes in the optical path control layer 41, the light from the light source 51 is emitted from the transparent substrate 44a to the reflector 50, and then the light reflected by the reflector 50 is allowed to enter the liquid crystal layer 49 as illumination light.

As shown in FIG. 13, a liquid crystal display device of a third conventional example disclosed in JP 2002-121050 A includes a liquid crystal layer 69, a pair of transparent substrates 64a, 64b sandwiching the liquid crystal layer 69, and a light source 71 located opposite to the side of the transparent substrate 64a. Light from the light source 71 is introduced into the transparent substrate 64a directly and via a reflector. The liquid crystal display device of the third conventional example is a transmission-type liquid crystal display device in which an optical path control layer 61 is disposed on the side of the transparent substrate 64a that faces away from the liquid crystal layer, and light whose optical path has been changed by the optical path control layer 61 is allowed to enter the liquid crystal display element as illumination light.

The transparent substrates 64a, 64b are made of a transparent glass material. A transparent low refractive index layer 65 having a lower refractive index than the transparent substrate 64a is disposed on the surface of the transparent substrate 64a that faces the liquid crystal layer 69. Moreover, a color filter 66, a transparent electrode 67a, and an alignment film 68a are disposed between the low refractive index layer 65 and the liquid crystal layer 69. Further, a transparent electrode 67b and an alignment film 68b are disposed in this order on the surface of the transparent substrate 64b that faces the liquid crystal layer 69, and a polarizer 62b is disposed on the opposite surface of the transparent substrate 64b from the liquid crystal layer.

On the other hand, a polarizer 62a, the optical path control layer 61, and a reflector 70 are disposed in this order on the opposite surface of the transparent substrate 64a from the liquid crystal layer. The optical path control layer 61 has a higher refractive index than the low refractive index layer 65 and is provided with slopes at an angle of 35° to 48°. In the liquid crystal display device of the third conventional example, the light introduced from the light source 71 into the transparent substrate 64a is propagated in the direction away from the light source 71 by repeating total reflection between the transparent substrate 64a and the reflector 70 due to the refractive index difference between the transparent substrate 64a and the low refractive index layer 65, and the reflector 70. Moreover, when the total reflection conditions are not fulfilled by the presence of the slopes in the optical path control layer 61, the light from the light source 71 is allowed to enter the liquid crystal layer 69 as illumination light.

DISCLOSURE OF INVENTION

Problem to be Solved by the Invention

However, in the conventional liquid crystal display devices as described above, the light from the light source is absorbed by the light absorbing layer with relatively high light absorption properties such as a color filter, and thus the light utilization efficiency of the light source may be reduced.

Specifically, in the liquid crystal display devices of the second and third conventional examples, the light from the light sources 51, 71 is introduced into the transparent substrates 44a, 64a, and the low refractive index layers 45, 65 are disposed on the surfaces of the transparent substrates 44a, 64a that face the liquid crystal layers 49, 69, respectively. The incident light is propagated through the transparent substrates 44a, 64a in the direction away from the light sources 51, 71 by being reflected from each of the interfaces between the transparent substrate 44a and the low refractive index layer 45 and between the transparent substrate 64a and the low refractive index layer 65 toward the transparent substrates 44a, 64a. Moreover, in the liquid crystal display devices of the second and third conventional examples, the refractive index differences between the transparent substrates 44a, 64a and the low refractive index layers 45, 65 are 0.05 or more, and more preferably 0.12 to 0.50. The low refractive index layers 45, 65 have a thickness of 100 nm or more, and more preferably 600 nm or more. With these configurations, it may be possible to suppress a leakage (emission) of light in the visible light range from the low refractive index layers 45, 65 into the color filters 46, 66.

However, in these conventional liquid crystal display devices, the light from the light sources 51, 71 is not reflected from each of the interfaces, depending on the angle or the like of the light traveling in the transparent substrates 44a, 64a, so that the amount of light emitted from the low refractive index layers 45, 65 to the color filters 46, 66 may be increased. Therefore, even if the refractive index differences between the transparent substrates 44a, 64a and the low refractive index layers 45, 65 and the thickness of each of the low refractive index layers 45, 65 fall in the above ranges, there are some cases where the leakage of light into the color filters 46, 66 cannot be sufficiently suppressed. Thus, in the liquid crystal display devices of the second and third conventional examples, the amount of light absorbed by the color filters 46, 66 is increased, which may reduce the light utilization efficiency of the light sources 51, 71.

Therefore, with the foregoing in mind, it is an object of the present invention to provide a transparent substrate capable of preventing a reduction in the light utilization efficiency, and an illumination device and a liquid crystal display device that use the transparent substrate.

Means for Solving Problem

A transparent substrate of the present invention includes the following: a transparent substrate body into which light is introduced through at least one side; a transparent low refractive index layer that is disposed on the substrate body and has a lower refractive index than a refractive index of the substrate body; and a transparent high refractive index layer that is disposed on the low refractive index layer and has a higher refractive index than the refractive index of the low refractive index layer.

In the transparent substrate with this configuration, the low refractive index layer having a lower refractive index than the substrate body is disposed on the substrate body, and the high refractive index layer having a higher refractive index than the low refractive index layer is disposed on the low refractive index layer. Therefore, even if the light introduced into the substrate body is to be emitted from the low refractive index layer to the outside, the high refractive index layer can reflect the light back to the substrate body. Consequently, unlike the above conventional examples, it is possible to prevent a reduction in the utilization efficiency of the light introduced into the substrate body.

It is preferable that the transparent substrate satisfies the following inequality (1):

$$n2 < n1 < n3 \quad (1)$$

where n1, n2, and n3 represent the refractive indexes of the substrate body, the low refractive index layer, and the high refractive index layer, respectively.

In this case, even if the light that is introduced into the substrate body and propagated at a large angle with respect to the normal to the surface of the substrate body is to be emitted from the low refractive index layer to the outside, it is ensured that the high refractive index layer will reflect the light back to the substrate body. Thus, a reduction in the light utilization efficiency can be prevented more reliably.

In the transparent substrate, a light absorbing layer with the light absorption properties may be disposed on the high refractive index layer.

In this case, it is possible not only to reduce the amount of light that is unnecessarily absorbed by the light absorbing layer, but also to suppress a decrease in the brightness of light that has passed through the light absorbing layer.

In the transparent substrate, the light absorbing layer may include color filter.

In this case, it is possible to suppress both the absorption of light by the color filter and a decrease in the brightness of light that has passed through the color filter.

An illumination device of the present invention includes a light source and any of the transparent substrates as described above. In the illumination device, the light source is located opposite to the side of the substrate body of the transparent substrate. Moreover, a reflector is provided on the opposite side of the substrate body from the surface on which the low refractive index layer is disposed. A light emitting portion is provided on the reflector side of the substrate body and emits the light introduced into the substrate body to the reflector.

In the illumination device with this configuration, light from the light source is introduced into the substrate body of the transparent substrate that is configured not to reduce the light utilization efficiency. Therefore, the illumination device can easily achieve high brightness. Since the light introduced into the substrate body is emitted from the light emitting portion to the reflector, and then reflected from the reflector to the substrate body, a thin lightweight illumination device can be easily configured while improving the light utilization efficiency of the light source.

In the illumination device, it is preferable that the light emitting portion includes a transparent film, a plurality of prisms made of a synthetic resin and provided on the transparent film, each prism having an inclined portion, and dielectric thin films bonded to the individual inclined portions so that the bonding surfaces of the dielectric thin films and the inclined portions are formed as a plurality of emission surfaces at which the light introduced into the substrate body is emitted to the reflector.

In this case, the light emitting portion with high rigidity, excellent strength, and ease of handling can be easily produced. Due to the presence of the dielectric thin films, only a specific polarized component can be taken out of the light from the light source and emitted to the reflector. Thus, the illumination device can easily achieve high brightness.

In the illumination device, the plurality of emission surfaces may be inclined at a predetermined angle and equally spaced, and the area of each of the emission surfaces facing the light source may be increased gradually with an increase in distance from the light source.

In this case, the light emitting portion can emit the light introduced from the light source into the substrate body toward the reflector using the emission surfaces while the light can be propagated appropriately. Therefore, the illumination device can easily emit planar light having uniform brightness to the outside.

In the illumination device, it is preferable that the light emitting portion is attached to the surface of the substrate body on the reflector side via a transparent adhesive layer, and that the refractive index of the substrate body, a refractive index of the transparent film, refractive indexes of the prisms, and a refractive index of the adhesive layer are the same or its approximate value.

In this case, the light from the light source can be propagated through each of the interfaces between the adhesive layer and the substrate body or the light emitting portion and the interfaces between the transparent film and the prisms without any reflection loss, so that the light utilization efficiency of the light source can be improved further.

In the illumination device, the light emitting portion may include a transparent film and a microlens array including a plurality of lenses with a convex shape that are provided on the transparent film.

In this case, the light introduced from the light source into the substrate body can be extracted and emitted to the reflector through each of the lenses included in the microlens array. Thus, the illumination device can easily achieve high brightness.

In the illumination device, it is preferable that the light source is configured using a point light source, and that the plurality of lenses included in the microlens array are arranged radially in a circular arc shape extending from the point light source as a center on the transparent film.

In this case, the light emitting portion can emit the light introduced from the point light source into the substrate body toward the reflector using the emission surfaces while the light can be propagated appropriately. Therefore, the illumination device can easily emit planar light having uniform brightness to the outside.

In the illumination device, it is preferable that the light emitting portion is attached to the surface of the substrate body on the reflector side via a transparent adhesive layer while each of the vertices of the lenses included in the microlens array is in contact with the surface of the substrate body on the reflector side, and that the refractive index of the substrate body, a refractive index of the transparent film, a refractive index each of the lenses, and a refractive index of the adhesive layer are the same or its approximate value.

In this case, the light from the light source can be propagated through each of the interfaces between the adhesive layer and the substrate body or the light emitting portion and the interfaces between the transparent film and the lenses without any reflection loss, so that the light utilization efficiency of the light source can be improved further.

In the illumination device, the light emitting portion may satisfy the following equation (1):

$$h=w^2/(4\times d) \quad (1)$$

where d represents the thickness of the adhesive layer, h represents the height of each of the lenses from the surface of the transparent film, and the width of each of the lenses is represented by 2w.

In this case, the directivity of the light emitted from the light emitting portion to the reflector can be improved, so that the illumination device can emit light with high directivity and high brightness to the outside.

In the illumination device, it is preferable that the reflector is a polarizing/reflecting plate that includes a reflecting layer for reflecting light emitted from the light emitting portion back to the light emitting portion and a polarizing layer formed integrally with the reflecting layer.

In this case, the polarizing layer serves to improve the polarization properties of light to be emitted from the illumination device to the outside, and thus can improve the brightness of the emitted light from the illumination device. Moreover, since the reflecting layer and the polarizing layer can be simultaneously incorporated into the illumination device, the assembly operation of the illumination device can be easily simplified.

In the illumination device, the light emitting portion may emit a specific polarized component of the light introduced into the substrate body to the reflector, and the polarization axis of the polarizing layer may be substantially aligned with the direction of polarization of the specific polarized component from the light emitting portion.

In this case, the polarizing layer can transmit the specific polarized component from the light emitting portion to the reflector without any loss, and the absorption of light by the polarizing layer can be kept to a minimum. Thus, a decrease in the brightness of the emitted light from the illumination device can be suppressed as much as possible.

A liquid crystal display device of the present invention includes a liquid crystal layer and a pair of substrates sandwiching the liquid crystal layer. Any of the transparent substrates as described above is used as one of the pair of substrates.

In the liquid crystal display device with this configuration, light from the light source is introduced into the substrate body of the transparent substrate that is configured not to reduce the light utilization efficiency. Therefore, the liquid crystal display device can easily achieve high light utilization efficiency of the light source as well as high brightness. Moreover, it is possible to prevent the generation of unwanted light that is directly emitted from the transparent substrate to the liquid crystal layer. Thus, unlike the above conventional examples, a decrease in both contrast and brightness caused by the unwanted light can be suppressed, providing the liquid crystal display device with excellent display quality.

Effects of the Invention

The present invention can provide a transparent substrate capable of preventing a reduction in the light utilization efficiency, and an illumination device and a liquid crystal display device that use the transparent substrate.

DESCRIPTION OF THE INVENTION

Hereinafter, preferred embodiments of a transparent substrate, an illumination device, and a liquid crystal display device of the present invention will be described with reference to the drawings. In the following description, the present invention is applied to a transmission-type liquid crystal display device as an example.

Embodiment 1

Figure 1:
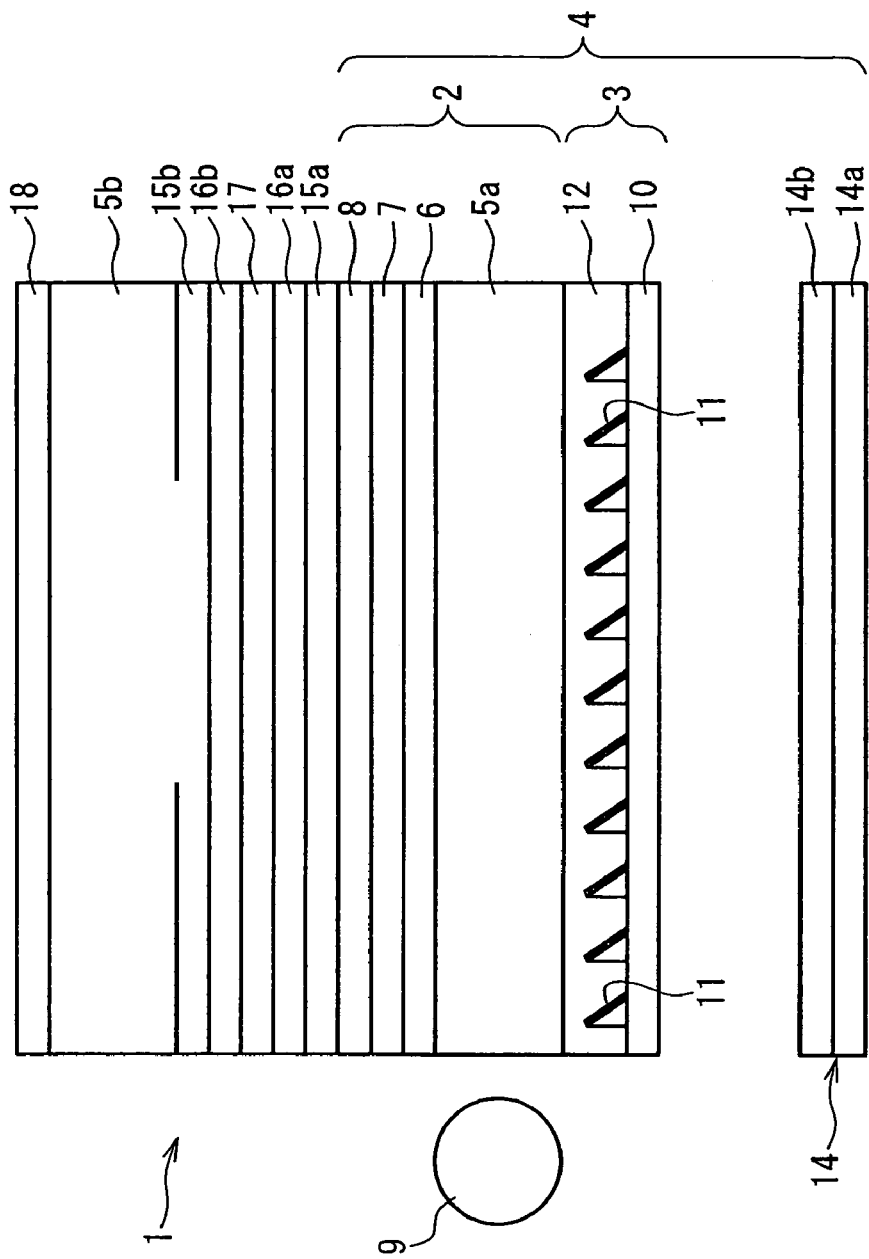
FIG. 1 is a diagram for explaining the main configuration of a liquid crystal display device of Embodiment 1 of the present invention.

FIG. 1 is a diagram for explaining the main configuration of a liquid crystal display device of Embodiment 1 of the present invention. In FIG. 1, a liquid crystal display device 1 of this embodiment includes a transparent substrate 2 of the present invention and a light emitting portion 3 that is attached to the lower surface of the transparent substrate 2 (on the non-display surface side of the liquid crystal display device 1). The liquid crystal display device 1 also includes a light source 9 that is located opposite to the left side of a first glass substrate 5a included in the transparent substrate 2 and a polarizing/reflecting plate 14 that is located opposite to the light emitting portion 3. The transparent substrate 2, the light emitting portion 3, the light source 9, and the polarizing/reflecting plate 14 constitute an illumination device 4 that is integrally incorporated into the liquid crystal display device 1.

The transparent substrate 2 includes the first glass substrate 5a as a substrate body, a low refractive index layer 6 that is disposed on the first glass substrate 5a, and a high refractive index layer 7 that is disposed on the low refractive index layer 6 and has a higher refractive index than the low refractive index layer 6. In the transparent substrate 2, a light absorbing layer 8 with relatively high light absorption properties is formed on the upper surface of the high refractive index layer 7. The transparent substrate 2 can prevent the light that is introduced from the light source 9 into the first glass substrate 5a from being transmitted through the high refractive index layer 7 and unnecessarily emitted to the light absorbing layer 8. Thus, it is possible to prevent a reduction in the light utilization efficiency of the light source 9 (which will be described in detail later).

The transparent substrate 2 is used as one of a pair of substrates sandwiching a liquid crystal layer 17 provided in the liquid crystal display device 1, and also is included in a liquid crystal display element liquid crystal panel) of the liquid crystal display device 1. That is, a transparent electrode 15a made of ITO is formed on the upper surface of the light absorbing layer 8 of the transparent substrate 2, and an alignment film 16a is further formed on the transparent electrode 15a.

Moreover, a second glass substrate 5b is disposed above the liquid crystal layer 17 as the other of the pair of substrates. A transparent electrode 15b made of ITO and an alignment film 16b are formed in this order on the surface of the second glass substrate 5b that faces the liquid crystal layer 17. In the liquid crystal display element, the liquid crystal layer 17 is sealed with a sealing member (not shown) and sandwiched between the transparent substrate 2 and the second glass substrate 5b. Moreover, the liquid crystal layer 17 is driven pixel by pixel, so that information, including characters and images, is displayed on the second glass substrate 5b.

The first and second glass substrates 5a, 5b are made of, e.g., a glass material that is rectangular in cross section and has a refractive index of 1.52 and a thickness of 0.50 mm. The first and second glass substrates 5a, 5b are arranged in parallel with each other.

The low refractive index layer 6 is made of a transparent material having a lower refractive index than the first glass substrate 5a. Specifically, a transparent fluorocarbon resin material may be used for the low refractive index layer 6. The low refractive index layer 6 is formed directly on the first glass substrate 5a, e.g., by spin coating to have a refractive index of 1.40 and a thickness of 360 to 920 nm.

The high refractive index layer 7 is made of a transparent material such as IZO (indium zinc oxide) and has a higher refractive index (e.g., 1.90) than the low refractive index layer 6. The high refractive index layer 7 is formed directly on the low refractive index layer 6, e.g., by sputtering to have a thickness of 130 nm.

The refractive indexes of the first and second glass substrates 5a, 5b, the low refractive index layer 6, and the high refractive index layer 7 were measured with a prism coupler (Metoricon 2010 PRISM COUPLER). The thicknesses of the low refractive index layer 6 and the high refractive index layer 7 were measured with a stylus step profilometer (manufactured by KLA-Tencor Corporation).

The light absorbing layer 8 includes R, G, and B color filters and a black matrix pattern (BM). These color filters and the black matrix pattern are formed successively on the high refractive index layer 7, e.g., by an electrodeposition method using the high refractive index layer 7 as an electrode.

The light source 9 is configured by a linear light source and can be, e.g., a cold-cathode tube (CCFL) located in the direction perpendicular to the sheet of FIG. 1.

The light emitting portion 3 is disposed on the surface of the first glass substrate 5a that faces away from the liquid crystal layer 17. The light emitting portion 3 emits the light from the light source 9 to the polarizing/reflecting plate 14 that serves as a reflector for reflecting the light toward the liquid crystal layer 17. Moreover, the transparent substrate 2 is configured so that the first glass substrate 5a also functions as a light guide plate for directing the light from the light source 9 in a predetermined direction (from the left side to the right side of FIG. 1). In the transparent substrate 2, the light reflected by the polarizing/reflecting plate 14 passes through the light emitting portion 3 and enters the first glass substrate 5a again, thereby irradiating the liquid crystal display element with the light from the light source 9 as illumination light.

Here, the light emitting portion 3 will be described specifically with reference to FIG. 2 showing the manufacturing process of the light emitting portion 3.

Figure 2A:
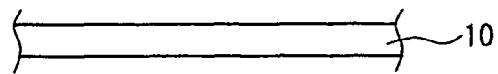
FIGS. 2A, 2B, 2C, 2D and 2E are cross-sectional schematic diagrams explaining a light emitting portion as shown in FIG. 1 and a manufacturing process of the light emitting portion.
Figure 2B:
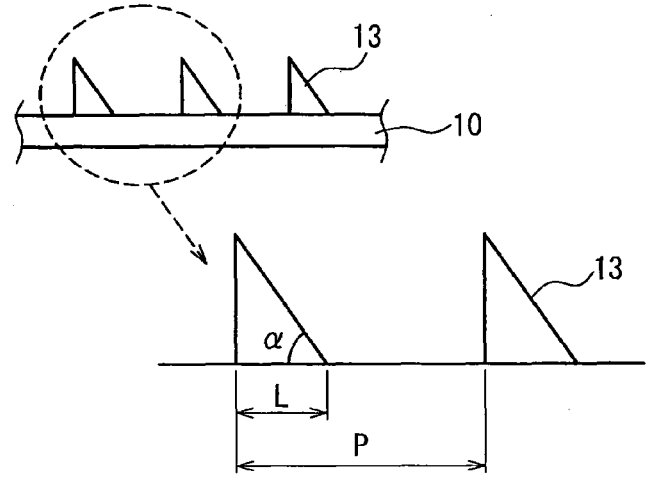

In FIGS. 2A and 2B, a transparent film 10 of the light emitting portion 3 can be, e.g., a transparent resin film (e.g., ZEONOR film manufactured by ZEON Corporation) having a refractive index of 1.52 and a thickness of 0.10 mm. A plurality of prisms 13, each of which has a cross section substantially in the form of a right triangle, are formed on the transparent film 10 by a 2P method, thus producing a prism sheet.

The prisms 13 are made of a transparent UV curable resin (e.g., UV curable acrylic resin). Such a material is selected on the grounds that the refractive index in the cured state is substantially the same as the refractive index (1.52) of the transparent film 10.

Each of the prisms 13 has a vertical portion and an inclined portion. The vertical portion is formed perpendicularly on the surface of the transparent film 10 in parallel with the left side of the first glass substrate 5a that is opposite to the light source 9. The inclined portion is formed at a predetermined angle α (e.g., 51°) with respect to the surface of the transparent film 10. In the prism sheet, dielectric thin films 11 (which will be described later) are formed on the individual inclined portions, and thus light can be emitted appropriately in the direction of the normal to the surface of the transparent film 10.

In the light emitting portion 3, the number and size of the prisms 13 of the prism sheet are determined by the size of the illumination device 4. That is, the prism sheet is designed in accordance with the size of the illumination device 4 comparable to, e.g., 1.5-type (22.86 mm long and 30.48 mm wide). The prism sheet (the light emitting portion 3) can emit uniform planar light to the lower side of FIG. 1 when the lateral dimension, namely the dimension in the propagation direction of the light from the light source 9 in FIG. 1 is 30.48 mm. Specifically, in the prism sheet, the prisms 13 are equally spaced at a predetermined pitch P (e.g., 0.06 mm), resulting in a sawtooth (stripe) shape. Moreover, the widths L of the prisms 13 are changed gradually from 0.005 mm to 0.06 mm so that the areas of their respective inclined portions are increased gradually in the direction away from the light source 9 (to the right side of FIG. 2). Thus, the prisms 13 are arranged so that the density is increased in the direction away from the light source 9. For the sake of the simplification, the width L and the inclined portion of each of the prisms 13 are illustrated in the same size in the drawings.

Figure 2C:
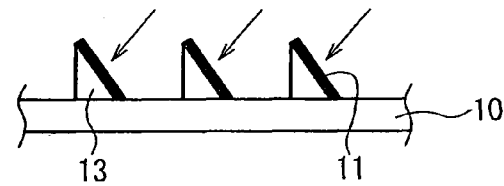

Next, as shown in FIG. 2C, a dielectric material such as ZnO having a refractive index of 2.0 is vacuum-deposited on the inclined portion of each of the prisms 13, so that the dielectric thin film 11 with a thickness of 70 nm is formed on the surface of the inclined portion. It is preferable that the dielectric thin film 11 is formed only on the surface of the inclined portion of the prism 13. In this embodiment, the dielectric material is deposited at 45° with respect to the surface of the inclined portion, thereby forming the dielectric thin film 11 only on the surface. The angle of inclination (the angle α) and thickness of the dielectric thin film 11 may be appropriately selected depending on the refractive index of the material used. In this embodiment, the angle of inclination and thickness of the ZnO film are selected so as to have a maximum reflectance when the dielectric thin film 11 is used as an interference reflecting film.

Moreover, the bonding (deposition) surfaces of the dielectric thin films 11 and the individual inclined portions of the prisms 13 function as emission surfaces at which the light from the light source 9 (FIG. 1) is emitted to the polarizing/reflecting plate 14. The s-polarized light contained in the light from the light source 9 is mainly selected at the emission surfaces and emitted to the polarizing/reflecting plate 14. In other words, the dielectric thin films 11 have light reflection properties (polarization dependence) that exhibit a higher reflectance for the s-polarized light than the p-polarized light. Thus, the light reflected (emitted) from the emission surfaces to the polarizing/reflecting plate 14 contains a large amount of s-polarized light, compared to the p-polarized light.

The emission surfaces are provided for each of the inclined portions of the prisms 13 that are formed with a pitch P and a width L. Therefore, the emission surfaces are inclined at the same angle (the angle α) and equally spaced in the light emitting portion 3. Moreover, the area of each of the emission surfaces facing the light source 9 is increased gradually with an increase in distance from the light source 9. Because of the presence of such emission surfaces inside the light emitting portion 3, the light incident from the light source 9 onto the first glass substrate 5a and the light emitting portion 3 can be appropriately propagated (directed) and emitted to the polarizing/reflecting plate 14 with the emission surfaces. Consequently, in the liquid crystal display device 1, the liquid crystal display element can be illuminated with planar light having uniform brightness, and thus the display quality can be easily improved.

Figure 2D:
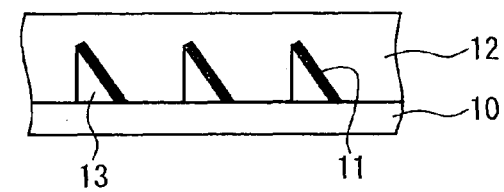
Figure 2E:
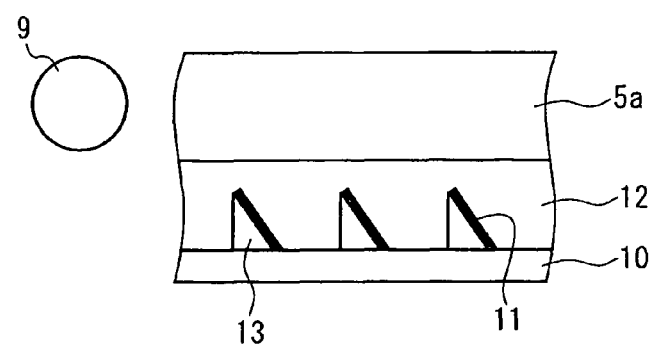

Subsequently, as shown in FIG. 2D, an adhesive layer 12 is applied to the prism sheet in which the dielectric thin films 11 have been formed, so that the surface of the transparent film 10 provided with the prisms 13 is flattened. Then, as shown in FIG. 2E, the prism sheet is attached to the surface of the first glass substrate 5a that faces the polarizing/reflecting plate 14 via the adhesive layer 12. In this manner, the light emitting portion 3 is integrated with the first glass substrate 5a. The adhesive layer 12 is made of a material having the same refractive index (1.52) or its approximate value (about ±0.01) as those of the first transparent substrate 5a, the transparent film 10, and the prisms 13. Specifically, an ultraviolet curable resin (e.g., acrylic resin) having a refractive index of 1.53 may be used for the adhesive layer 12. This can minimize the generation of unwanted reflected light at each of the interfaces in the transparent substrate 2 and the light emitting portion 3. Thus, the light from the light source 9 can be propagated through each of the interfaces between the adhesive layer 12 and the first glass substrate 5a or the light emitting portion 3 and the interfaces between the transparent film 10 and the prisms 13 without any reflection loss, so that the light utilization efficiency of the light source 9 can be improved further.

Referring back to FIG. 1, the polarizing/reflecting plate 14 includes a reflecting layer 14a for reflecting the light emitted from the light emitting portion 3 back to the light emitting portion 3 and a polarizing layer 14b for polarizing the light reflected by the reflecting layer 14a. The reflecting layer 14a and the polarizing layer 14b are bonded together via an adhesive layer (not shown). Therefore, the reflecting layer 14a and the polarizing layer 14b are integrated into the polarizing/reflecting plate 14. The reflecting layer 14a can be, e.g., an Ag thin film with a thickness of about 0.1 mm. The polarizing layer 14b can be, e.g., a polarizing film with a thickness of about 0.25 mm. As described above, since the light emitted from the light emitting portion 3 to the polarizing/reflecting plate 14 contains a large amount of s-polarized light, the transmission (polarization) axis of the polarizing layer 14b is aligned with an s-polarization axis. Accordingly, the polarizing layer 14b can transmit the s-polarized light from the light emitting portion 3 to the reflecting layer 14a without any loss, and the absorption of light by the polarizing layer 14b can be kept to a minimum. Thus, a decrease in the brightness of the emitted light from the illumination device 4 can be suppressed as much as possible.

A polarizer 18 is formed on the surface of the second glass substrate 5b. The polarizer 18 can be, e.g., a polarizing film with a thickness of about 0.25 mm.

Figure 4:
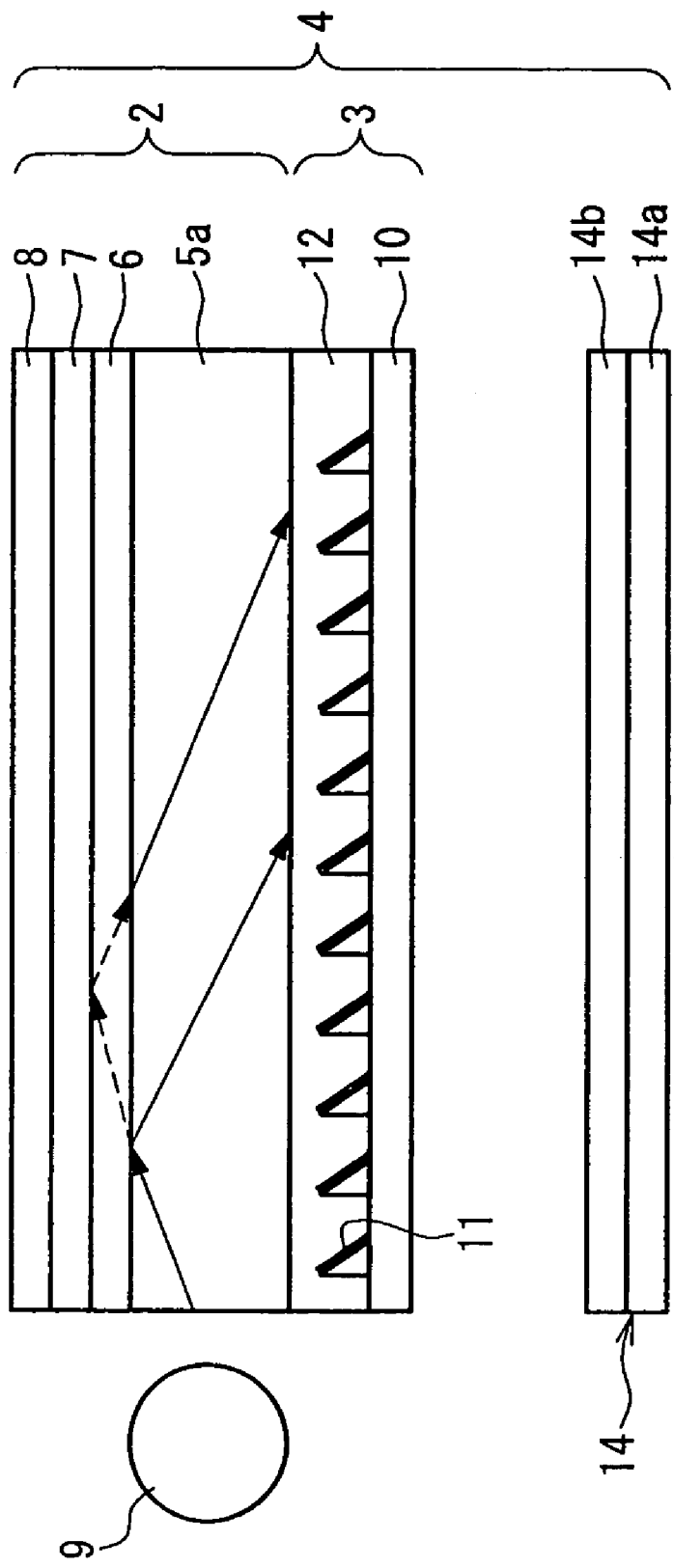
FIG. 4 is a diagram illustrating the function of a transparent substrate as shown in FIG. 1.
Figure 5:
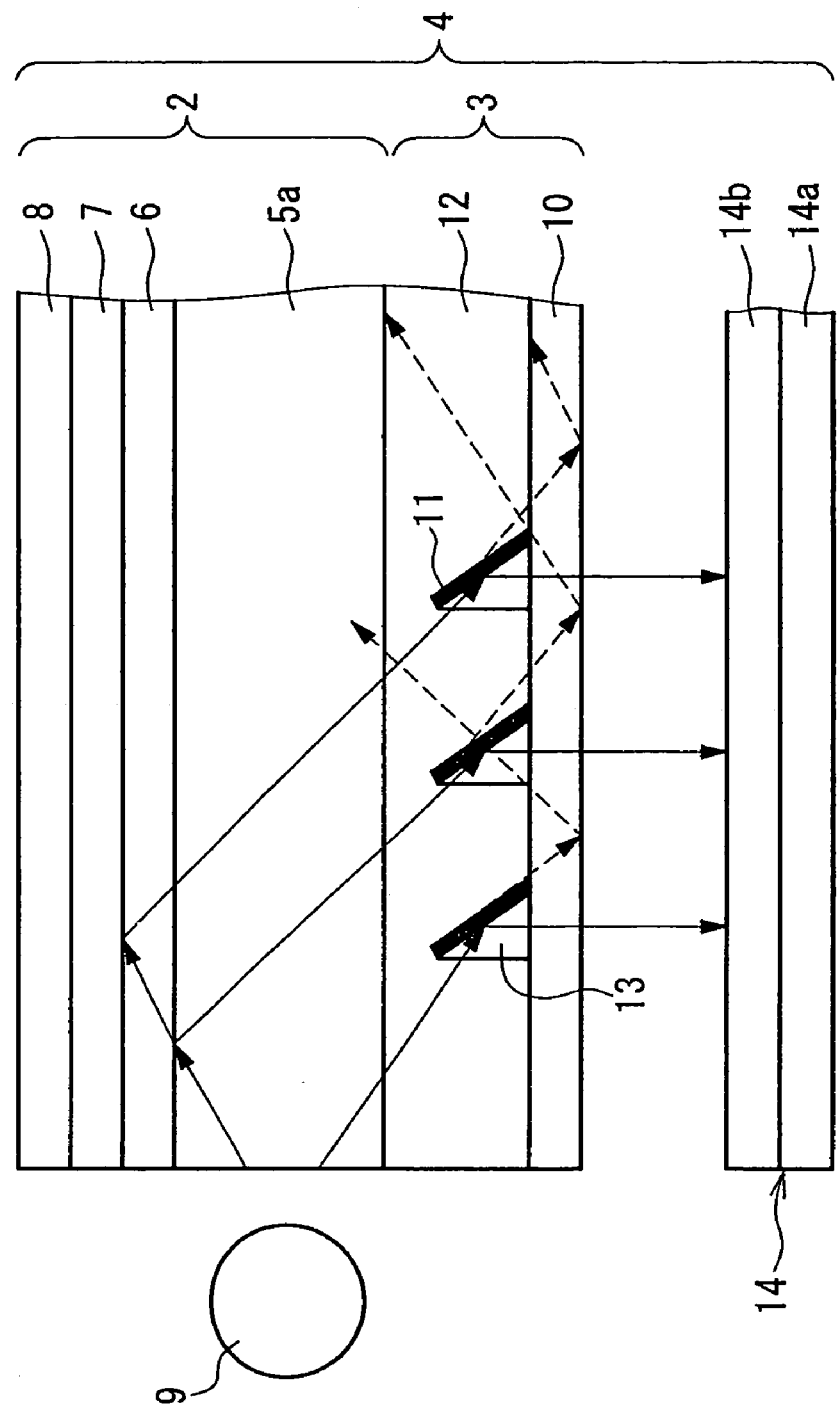
FIG. 5 is a diagram illustrating an operation example of the light emitting portion.

The operations of the liquid crystal display device 1 of this embodiment having the above configuration will be described specifically with reference to FIGS. 3 to 5 as well.

Figure 3:
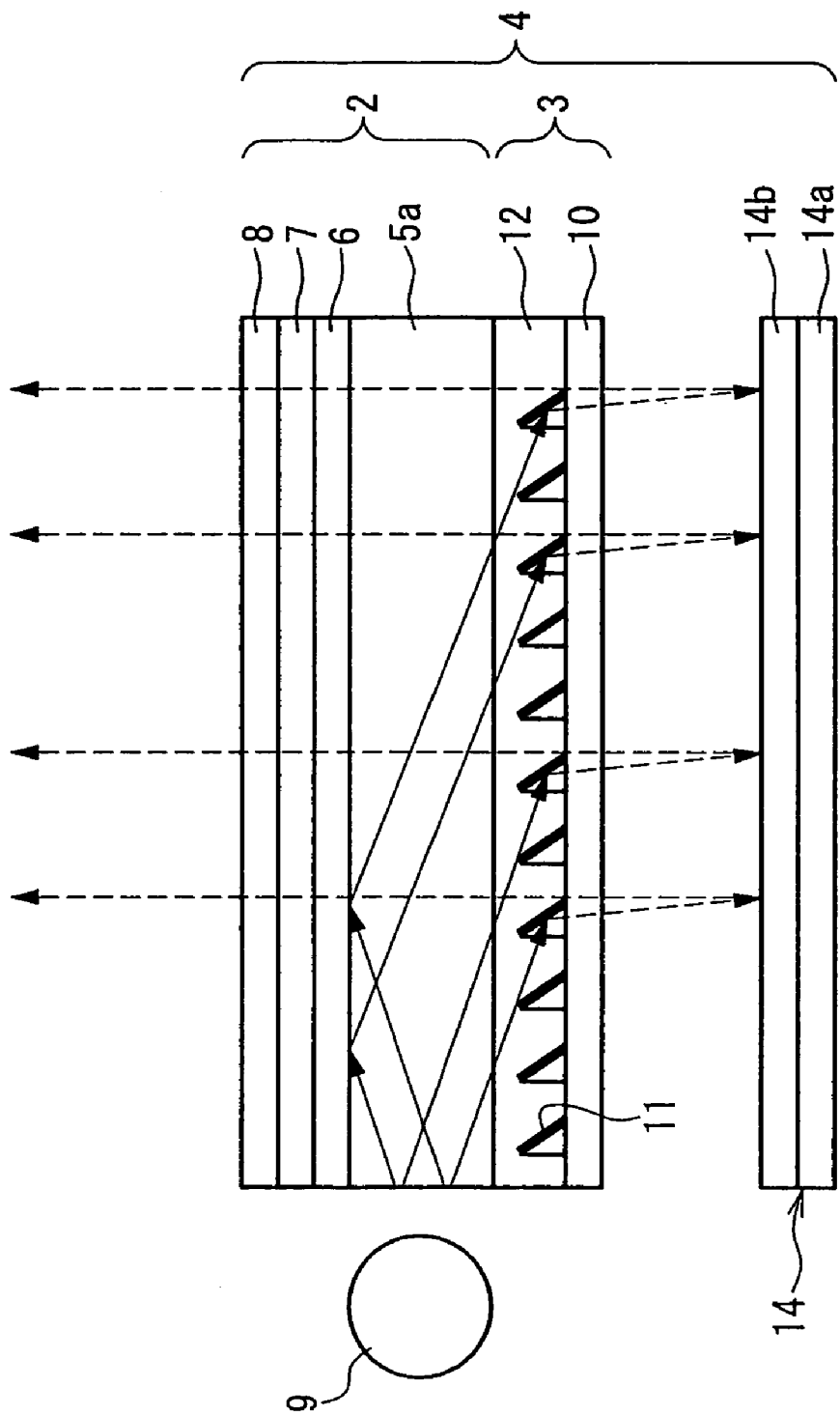
FIG. 3 is a diagram for explaining the main configuration of an illumination device as shown in FIG. 1.

In the liquid crystal display device 1, as indicated by the arrows of solid lines in FIG. 3, the light introduced from the light source 9 into the first glass substrate 5a is propagated in the first glass substrate 5a and the light emitting portion 3. In each of the first glass substrate 5a and the light emitting portion 3, the light is propagated by total reflection due to the refractive index difference between the first glass substrate 5a and the low refractive index layer 6 and the refractive index difference between the light emitting portion 3 and the air.

When the light traveling in the light emitting portion 3 reaches the emission surface that is the bonding surface of the dielectric thin film 11 and the prism 13 (FIG. 2), the light is reflected from the emission surface to the polarizing/reflecting plate 14 and extracted as illumination light for the liquid crystal display element, as indicated by the arrows of dotted lines in FIG. 3. The extracted illumination light is reflected from the polarizing/reflecting plate 14 to the transparent substrate 2, so that the liquid crystal display element is illuminated. Thereafter, the illumination light for the liquid crystal display element enters the liquid crystal layer 17, where the state of polarization is modulated for each pixel. Then, the liquid crystal display device 1 controls the amount of the illumination light passing through the polarizer 18, thereby displaying desired images.

In the transparent substrate 2, the low refractive index layer 6 and the high refractive index layer 7 are formed in this order on the first glass substrate 5a. With this configuration, the light introduced from the light source 9 into the first glass substrate 5a can be prevented as much as possible from directly entering the light absorbing layer 8 from the high refractive index layer 7. As indicated by the arrows of solid lines in FIG. 4, when the light introduced from the light source 9 into the first glass substrate 5a enters the interface between the first glass substrate 5a and the low refractive index layer 6 at an angle smaller than the total reflection angle, part of the incident light is reflected from the interface to the first glass substrate 5a. On the other hand, the rest of the incident light is refracted into the low refractive index layer 6 and travels toward the high refractive index layer 7, as indicated by the arrows of dotted lines in FIG. 4. However, this light is not emitted to the light absorbing layer 8, but is reflected from the interface between the low refractive index layer 6 and the high refractive index layer 7 to the low refractive index layer 6 and returned to the inside of the first glass substrate 5a.

The first glass substrate 5a, the low refractive index layer 6, and the high refractive index layer 7 satisfy the following inequality (1):

$$n2 < n1 < n3 \qquad (1)$$

where n1, n2, and n3 represent the refractive indexes of the first glass substrate 5a, the low refractive index layer 6, and the high refractive index layer 7, respectively.

Specifically, as described above, the refractive indexes n1, n2, and n3 of the first glass substrate 5a, the low refractive index layer 6, and the high refractive index layer 7 are 1.52, 1.40, and 1.90, satisfying the inequality (1). By setting the refractive indexes n1, n2, and n3 to satisfy the inequality (1), even if the light that is introduced into the first glass substrate 5a and propagated at a large angle with respect to the normal to the surface of the first glass substrate 5a (i.e., an angle smaller than the total reflection angle) is to be emitted from the low refractive index layer 6 to the outside, it is ensured that the high refractive index layer 7 will reflect the light back to the first glass substrate 5a. Thus, a reduction in the light utilization efficiency of the light source 9 can be prevented more reliably.

The light introduced from the light source 9 into the transparent substrate 2 is broadly divided into two light paths. That is, as indicated by the arrows of solid lines in FIG. 5, part of the light introduced from the light source 9 into the transparent substrate 2 is reflected by the low refractive index layer 6 or the high refractive index layer 7 and travels in the transparent substrate 2 and the light emitting portion 3 in the propagation direction (to the right side of FIG. 5). In this case, the refractive indexes of the transparent film 10, the adhesive layer 12, and the prisms 13 are substantially the same. Therefore, the light traveling in the light emitting portion 3 is propagated without any reflection loss at each of the interfaces between the transparent film 10, the adhesive layer 12, and the prisms 13, and returned to the inside of the first glass substrate 5a by the total refraction at the interface with the air.

On the other hand, another light path reaches the emission surface that is the interface between the dielectric thin film 11 having a high refractive index and the inclined portion of the prism 13 during the propagation in the light emitting portion 3. Then, only the s-polarized light of the light that has reached the emission surface is reflected to the polarizing/reflecting plate 14 and extracted as illumination light, as indicated by the arrows of solid lines in FIG. 5. The p-polarized light is transmitted through the dielectric thin film 11, reflected from the interface between the light emitting portion 3 and the air to the light emitting portion 3 as propagation light, and returned to the inside of the first glass substrate 5a, as indicated by the arrows of dotted lines in FIG. 5.

In this embodiment, the transparent substrate 2 into which light is introduced from the light source 9 includes the transparent first glass substrate (substrate body) 5a and the transparent low refractive index layer 6 that is disposed on the first glass substrate 5a and has a lower refractive index than the first glass substrate 5a. Moreover, the transparent substrate 2 includes the transparent high refractive index layer 7 that is disposed on the low refractive index layer 6 and has a higher refractive index than the low refractive index layer 6. Therefore, even if the light introduced from the light source 9 into the first glass substrate 5a is to be emitted from the low refractive index layer 6 to the outside, the high refractive index layer 7 can reflect the light to the first glass substrate 5a, so that the light can be reused. Consequently, unlike the above conventional examples, the incident light from the light source 9 can be prevented from being emitted directly from the inside to the light absorbing layer 8 of the transparent substrate 2 and being absorbed by the light absorbing layer 8. Thus, it is possible to prevent a reduction in the light utilization efficiency of the light source 9.

As described above, this embodiment can prevent a reduction in the light utilization efficiency in the transparent substrate 2 that also serves as the light guide plate. Therefore, the light utilization efficiency of the light source 9 is high, and the illumination device 4 and the liquid crystal display device 1 can easily achieve high brightness, thinness, and light weight. Moreover, it is possible to prevent the generation of unwanted light that is directly emitted from the transparent substrate 2 to the liquid crystal layer 17. Thus, unlike the above conventional examples, a decrease in both contrast and brightness caused by the unwanted light can be suppressed, providing the liquid crystal display device 1 with excellent display quality.

Table 1 shows the results of the verification test conducted by the present inventors.

In this verification test, a product of this embodiment as shown in FIG. 1 and a conventional product in which the light absorbing layer 8 was formed directly on the low refractive index layer 6 without interposing the high refractive index layer 7 were prepared. For each of the product of this embodiment and the conventional product, three samples that differed in thickness of the low refractive index layer 6 were prepared, and the amount of light (brightness and luminous flux) emitted from the light absorbing layer 8 to the outside was measured. Assuming that the result of the measurement of a reference product in which none of the low refractive index layer 6, the high refractive index layer 7, and the light absorbing layer 8 were formed on the first glass substrate 5a was 100%, the results of the measurement of the product of this embodiment were compared with those of the conventional product. The brightness and the luminous flux were measured with an EZ Contrast 160R manufactured by ELDIM.

TABLE 1

| Low refractive index layer | | Brightness (cd/m$^2$) | | Luminous flux (lm) | |
|---|---|---|---|---|---|
| Thickness | Refractive index | Product of this embodiment | Conventional product | Product of this embodiment | Conventional product |
| 360 nm | 1.40 | 94% | 75% | 75% | 47% |
| 490 nm | 1.40 | 100% | 86% | 80% | 53% |
| 920 nm | 1.40 | 100% | 95% | 81% | 55% |

As is evident from Table 1, the product of this embodiment including the high refractive index layer 7 formed on the low refractive index layer 6 exhibits higher brightness and luminous flux than the conventional product. The results confirm that the high refractive index layer 7 can prevent the leakage of light into the light absorbing layer 8, and thus can improve the light utilization efficiency of the light source 9.

In the above explanation, the light emitting portion 3 includes the dielectric thin films 11 and the prisms 13, and the bonding surfaces of the dielectric thin films 11 and the inclined portions of the prisms 13 function as the emission surfaces. However, the light emitting portion of this embodiment is not limited thereto. Specifically, optical media (optical thin films) with different refractive indexes may be bonded together, and the bonding surface may be used as an emission surface. Nevertheless, compared to such a light emitting portion obtained by bonding the optical thin films with different refractive indexes, the light emitting portion including the emission surfaces formed by the synthetic resin prisms 13 and the dielectric thin films 11 is preferred because the light emitting portion with high rigidity, excellent strength, and ease of handling can be easily produced. Moreover, the use of the dielectric thin films can greatly change the reflectance of each of the s-polarized light and the p-polarized light, and therefore the light emitting portion can emit the s-polarized light efficiently. Thus, the amount of the illumination light can be easily increased.

In the above explanation, although the light source 9 using a single cold-cathode tube is located on the left side of the first glass substrate 5a, this embodiment is not limited thereto. For example, a linear light source such as a hot-cathode tube or other fluorescent tubes may be located on each of the two opposite sides of the first glass substrate 5a, or a point light source such as a plurality of LEDs or an EL (electroluminescent) element may be located opposite to one side of the first glass substrate 5a. In this embodiment, however, the prisms 13 of the light emitting portion 3 are arranged in a stripe shape. Therefore, when the point light source such as a LED is located directly opposite to the side of the first glass substrate 5a, a bright portion (referred to as "emission line" in the following) occurs in accordance with the location of the point light source and may degrade the display quality of the liquid crystal display device 1.

For this reason, when the point light source is used, it is preferable that the light guide plate or the like is placed between the point light source and the first glass substrate 5a so as to convert the point light emission into linear light emission, and that the linear light enters the first glass substrate 5a. When the prisms 13 are arranged radially in a circular arc shape extending from the point light source as a center, uniform illumination light can be easily obtained while preventing the occurrence of the emission line.

Embodiment 2

Figure 6:
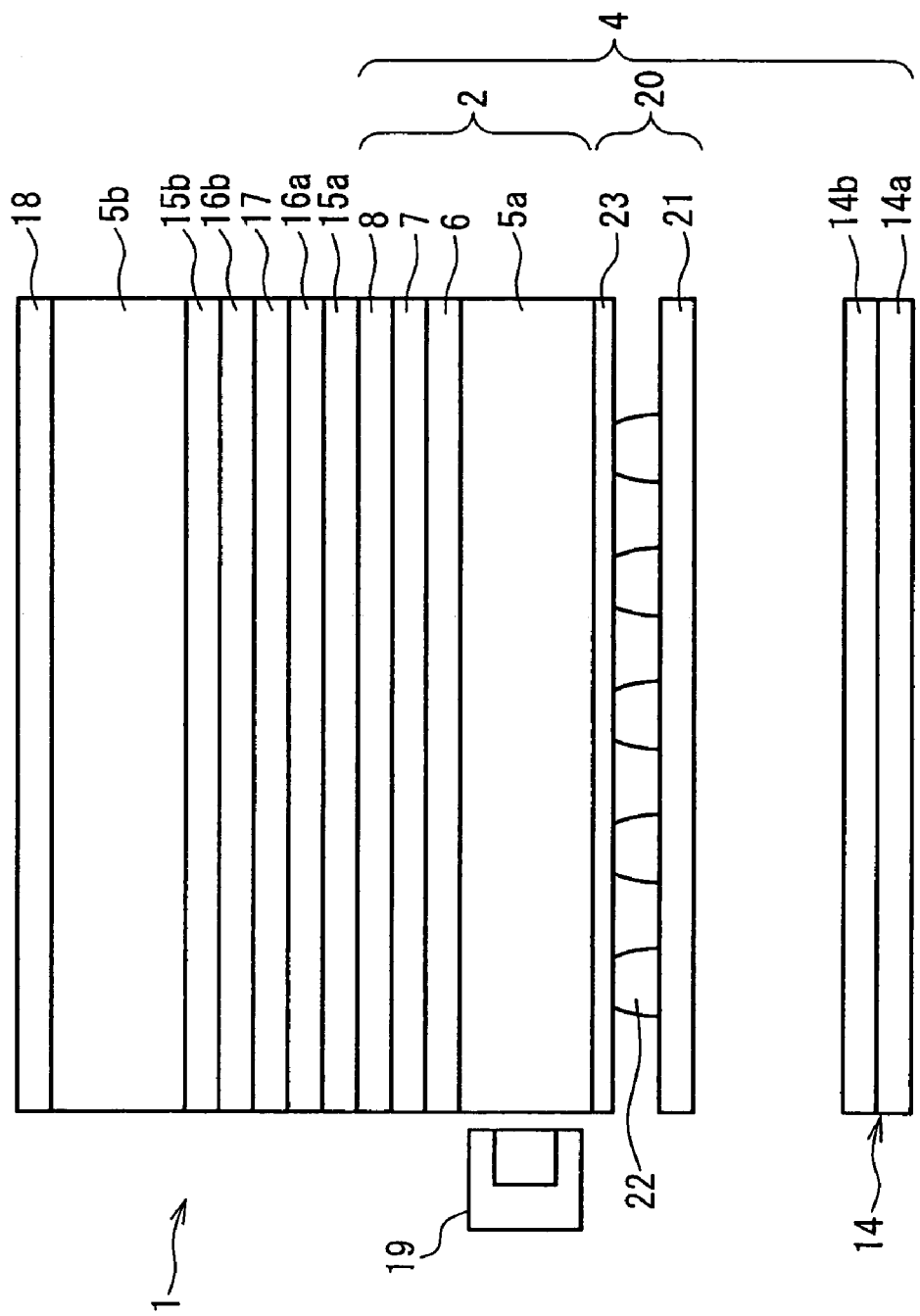
FIG. 6 is a diagram for explaining the main configuration of a liquid crystal display device of Embodiment 2 of the present invention.

FIG. 6 is a diagram for explaining the main configuration of a liquid crystal display device of Embodiment 2 of the present invention. In FIG. 6, this embodiment differs from Embodiment 1 mainly in that a point light source is used instead of the linear light source, and a microlens array including a plurality of lenses is used in the light emitting portion. The same components as those in Embodiment 1 are denoted by the same reference numerals, and the explanation will not be repeated.

Referring to FIG. 6, in a liquid crystal display device 1 of this embodiment, a light source 19 is configured by a point light source using, e.g., a LED. The light source 19 is located opposite to the center portion of a first glass substrate 5a in the direction perpendicular to the sheet of FIG. 6.

A light emitting portion 20 includes a transparent film 21 and a microlens array including a plurality of lenses 22 formed on the transparent film 21. The light emitting portion 20 is attached to the surface of the first glass substrate 5a that faces away from a liquid crystal layer 17 (i.e., the surface facing a polarizing/reflecting plate 14) via an adhesive layer 23.

Here, the light emitting portion 20 will be described specifically with reference to FIG. 7 showing the manufacturing process of the light emitting portion 20.

Figure 7A:
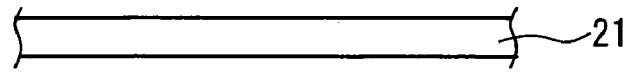
FIGS. 7A, 7B and 7C are cross-sectional schematic diagrams explaining a light emitting portion as shown in FIG. 6 and a manufacturing process of the light emitting portion.
Figure 7B:
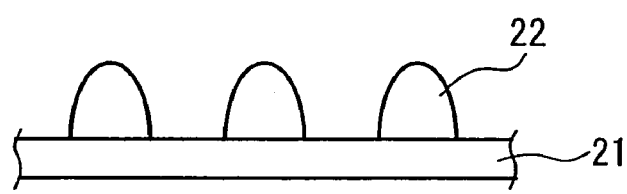

In FIGS. 7A and 7B, the transparent film 21 of the light emitting portion 20 can be, e.g., a transparent resin film (e.g., ARTON film manufactured by JSR Corporation) having a refractive index of 1.52 and a thickness of 0.10 mm. The microlens array including a plurality of lenses 22, each of which has a cross section in the form of a symmetric convex paraboloid, is formed on the transparent film 21 by the 2P method.

The lenses 22 are made of a transparent UV curable resin (e.g., UV curable acrylic resin). Such a material is selected on the grounds that the refractive index in the cured state is substantially the same as the refractive index (1.52) of the transparent film 21.

Figure 7C:
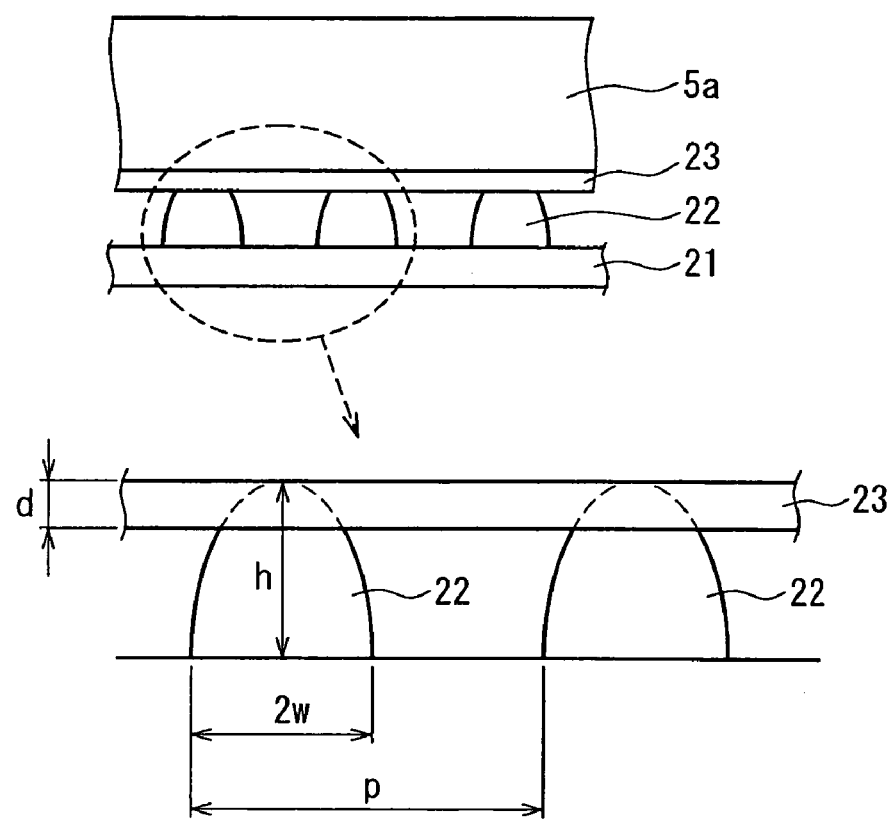

Next, as shown in FIG. 7C, the transparent adhesive layer 23 with a thickness of 0.005 mm is applied to the surface of the first glass substrate 5a, and the light emitting portion 20 (FIG. 6) is attached to the transparent substrate 2 (FIG. 6) via the adhesive layer 23 while each of the vertices of the lenses 22 of the microlens array is in contact with the surface of the first glass substrate 5a. In this manner, the light emitting portion 20 is integrated with the transparent substrate 2.

The adhesive layer 23 is made of a material having the same refractive index (1.52) or its approximate value (about ±0.01) as those of the first glass substrate 5a, the transparent film 21, and the lenses 22. Specifically, the ultraviolet curable resin (e.g., acrylic resin) having a refractive index of 1.52 may be used for the adhesive layer 23. This can minimize the generation of unwanted reflected light at each of the interfaces in the transparent substrate 2 and the light emitting portion 20. Thus, the light from the light source 19 can be propagated through each of the interfaces between the adhesive layer 23 and the first glass substrate 5a or the light emitting portion 20 and the interfaces between the transparent film 21 and the lenses 22 without any reflection loss, so that the light utilization efficiency of the light source 19 can be improved further.

In the microlens array, as shown in FIG. 7C, each of the lenses 22 and the adhesive layer 23 are formed to satisfy the following equation (1):

$$h = w^2/(4 \times d) \quad (1)$$

where d represents the thickness of the adhesive layer 23, h represents the height of each lens from the surface of the transparent film, and the width of each lens is represented by $2w$. Specifically, each of the lenses 22 of the microlens array is in the form of a paraboloid having a height h of 0.02 mm=$0.02^2/(4 \times 0.005)$) when one-half of the width $2w$ is 0.02 mm.

The pitch p of the lenses 22 closer to the light source 19 is 0.40 mm. This pitch p is reduced with an increase in distance from the light source 19 and changed to 0.04 mm at the farthest edge. Therefore, the arrangement of the lenses 22 of the microlens array varies in density, so that the intensity distribution of the emitted light from the light emitting portion 20 can be uniform in a plane. Consequently, in the liquid crystal display device 1, the liquid crystal display element can be illuminated with planar light having uniform brightness, and thus the display quality can be easily improved.

Figure 8A:
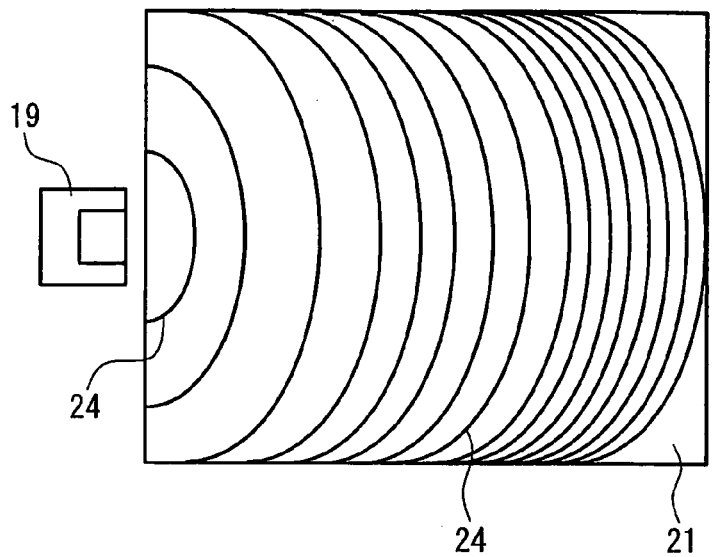
FIG. 8A is a diagram illustrating an arrangement of a plurality of lenses included in the light emitting portion in FIG. 6.
Figure 8B:
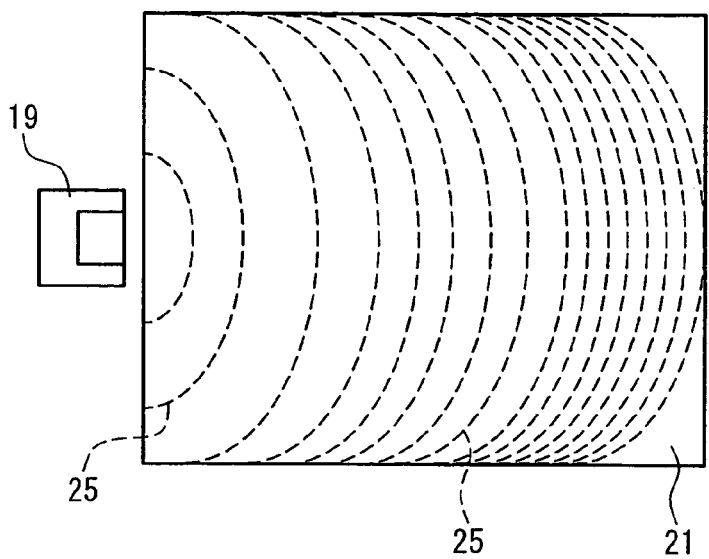
FIG. 8B is a diagram illustrating another arrangement of the lenses.
Figure 9:
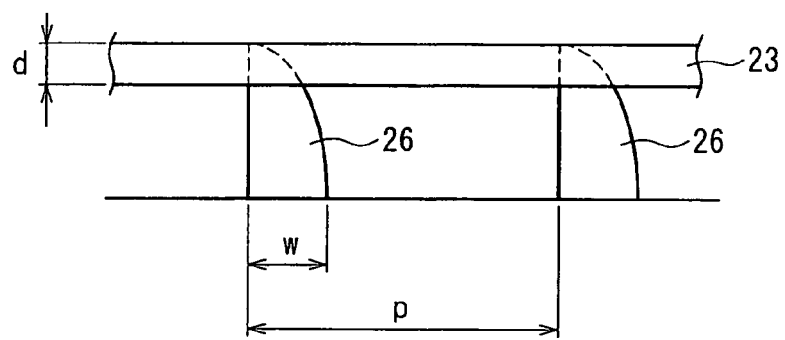
FIG. 9 is a diagram illustrating a modified example of the lenses.

In the microlens array, as indicated by the solid lines 24 in FIG. 8A, the lenses 22 are arranged radially in a circular arc shape extending from the light source 19 as a center on the transparent film 21. By arranging the lenses 22 in this manner, when the light from the light source 19 radially enters the first glass substrate 5a, the incident light is reflected by the reflecting surface of each of the lenses 22 i.e., the interface of each lens and the air) in the substantially vertical direction, and thus can be emitted to the polarizing/reflecting plate 14. Accordingly, the illumination device 4 can emit uniform illumination light while suppressing the occurrence of the emission line. When the lenses 22 of the microlens array are arranged radially in a circular arc shape, they do not have to be formed continuously, but may be formed discretely (discontinuously), as indicated by the dotted lines 25 in FIG. 8B. Moreover, the shape of the lenses 22 does not need to be a symmetric paraboloid, as shown in FIG. 7, and lenses 26 with an asymmetric paraboloidal shape also can be used, as shown in FIG. 9.

The operations of the liquid crystal display device 1 of this embodiment having the above configuration will be described specifically with reference to FIG. 10 as well.

Figure 10:
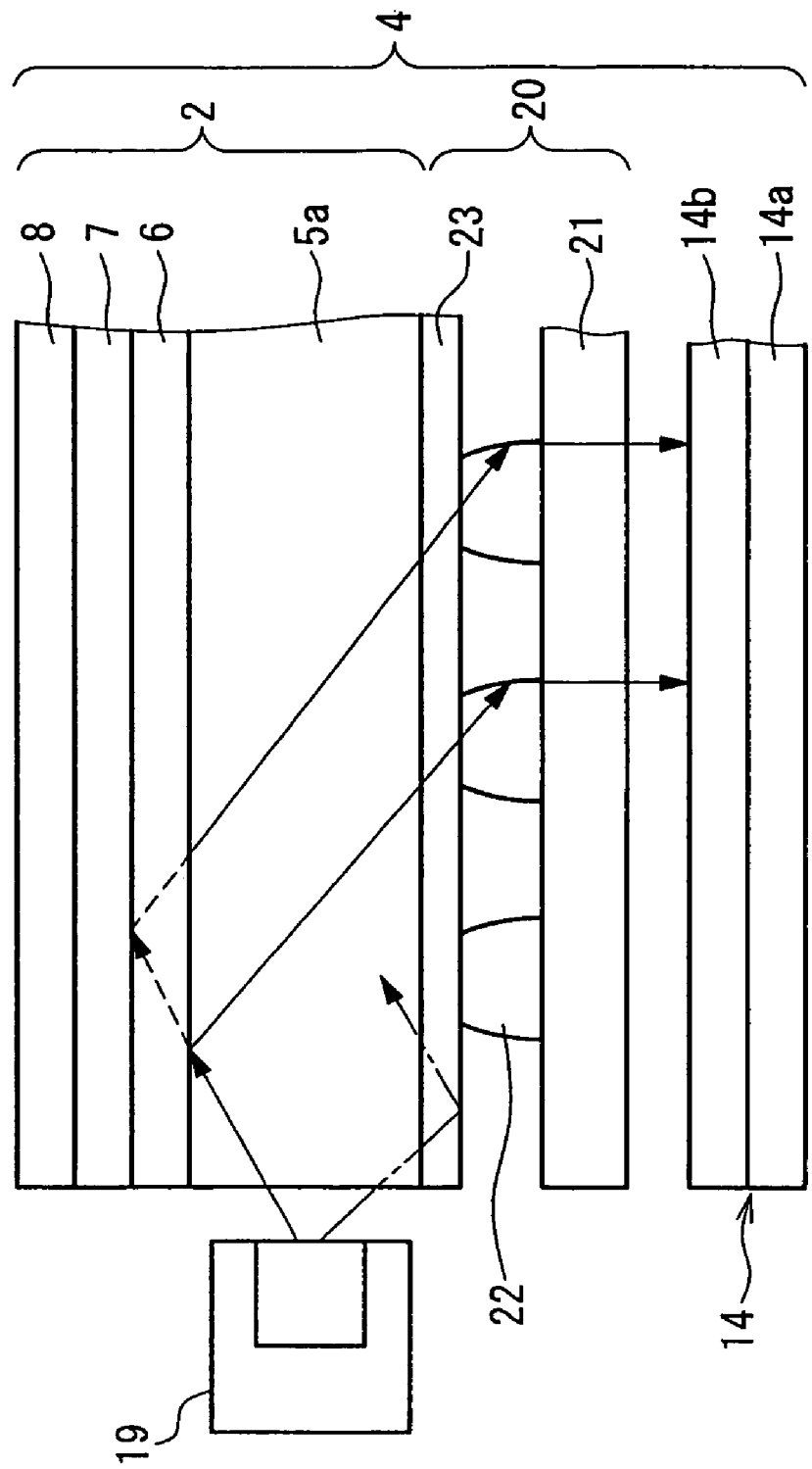
FIG. 10 is a diagram illustrating an operation example of an illumination device as shown in FIG. 6.
Figure 11:
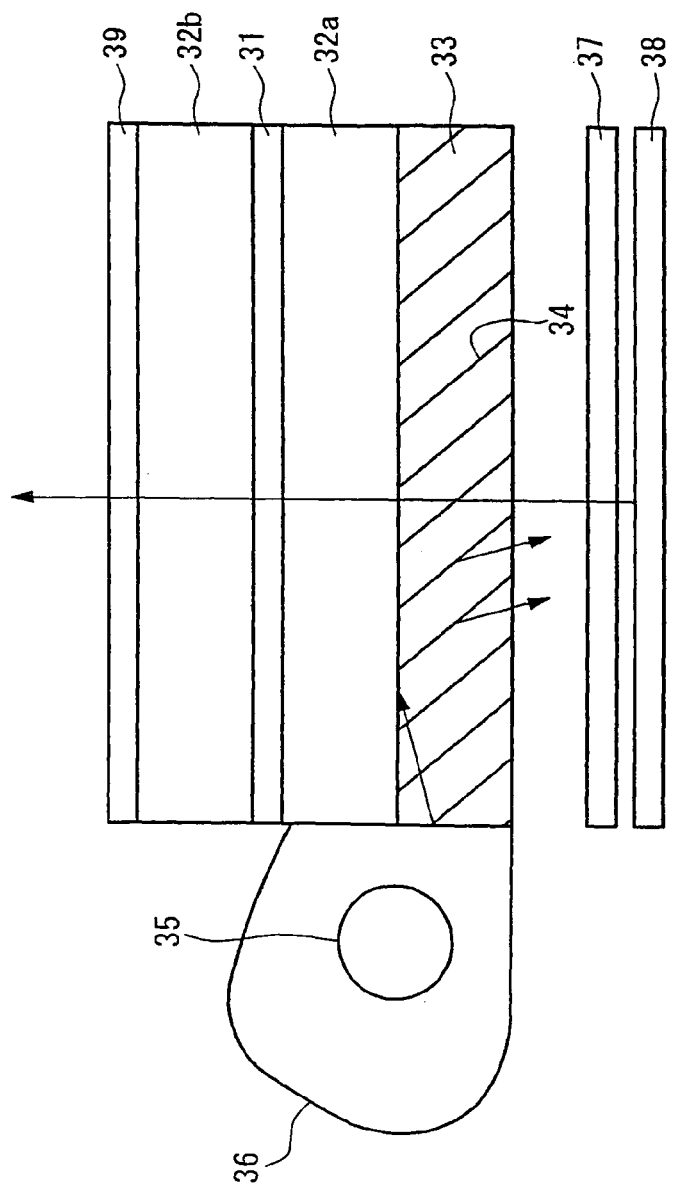
FIG. 11 is a diagram for explaining a liquid crystal display device of a first conventional example.
Figure 12:
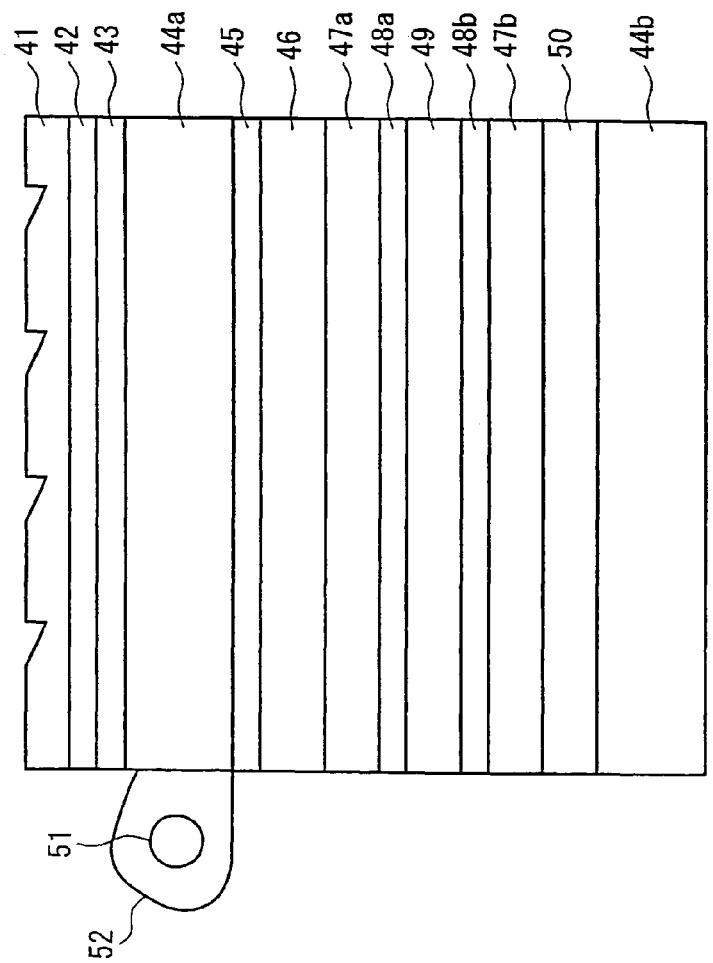
FIG. 12 is a diagram for explaining a liquid crystal display device of a second conventional example.
Figure 13:
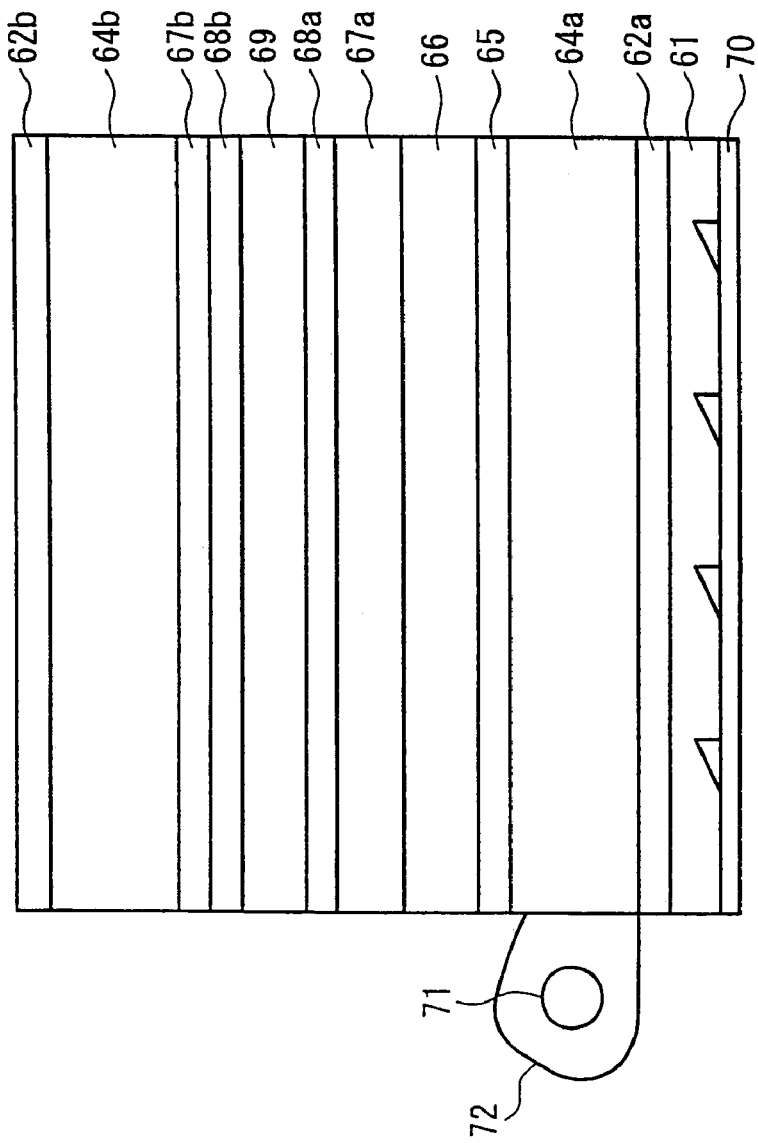
FIG. 13 is a diagram for explaining a liquid crystal display device of a third conventional example.

In the liquid crystal display device 1, as indicated by the arrows of solid lines in FIG. 10, the light introduced from the light source 19 into the first glass substrate 5a is propagated in the first glass substrate 5a, reflected totally by the microlens array of the light emitting portion 20, and emitted to the polarizing/reflecting plate 14 as illumination light for the liquid crystal display element.

Like Embodiment 1, the light is propagated in the first glass substrate 5a while being reflected from the low refractive index layer 6 or the high refractive index layer 7 to the first glass substrate 5a, and thus is not emitted directly to the light absorbing layer 8. Moreover, as indicated by the alternate long and two short dashes lines in FIG. 10, the light is totally reflected by the surface of the adhesive layer 23 not in contact with the lenses 22 of the microlens array due to the refractive index difference between the adhesive layer 23 and the air, and the reflected light is returned to the inside of the first glass substrate 5a.

In the portions where the adhesive layer 23 is in contact with each of the vertices of the lenses 22 of the microlens array, as indicated by the arrows of solid lines in FIG. 10, the light is transmitted through the lens 22, reflected totally by the paraboloid of the lens 22, and emitted to the polarizing/reflecting plate 14 through the transparent film 21 as illumination light for the liquid crystal display element.

When each of the lenses 22 and the adhesive layer 23 satisfy the equation (1), the focal length of the paraboloid is determined to be the same as the height h of the equation (1), and defined by the height at which the vertex portion of each of the lenses 22 comes into contact with the adhesive layer 23. Moreover, the light traveling in each of the lenses 22 is emitted from the interfaces between the adhesive layer 23 and the vertex portions of the lenses 22 that are embedded in the adhesive layer 23, similarly to the light emitted from a point light source. That is, the light can be aligned with the normal direction and emitted through the lenses 22. This can improve the directivity of the light emitted from the light emitting portion 20 to the polarizing/reflecting plate 14, so that the illumination device 4 can emit light with high directivity and high brightness to the liquid crystal display element as illumination light.

With the above configuration, as is the case with Embodiment 1, the incident light from the light source 19 can be prevented from being emitted directly from the inside to the light absorbing layer 8 of the transparent substrate 2 and being absorbed by the light absorbing layer 8. Thus, it is possible to prevent a reduction in the light utilization efficiency of the light source 19. Therefore, like Embodiment 1, the light utilization efficiency of the light source 19 is high, and the illumination device 4 and the liquid crystal display device 1 can easily achieve high brightness, thinness, and light weight. Moreover, the liquid crystal display device 1 with excellent display quality can be provided by suppressing a decrease in both contrast and brightness.

In the explanation of Embodiment 2, although the microlens array includes a plurality of lenses having a convex cross section, the microlens array of this embodiment is not limited thereto. For example, the microlens array may include a plurality of lenses having a semi-convex cross section.

Moreover, a linear light source such as a cold-cathode tube may be used other than the light source as described above. However, when the linear light source is used, it is preferable that the lenses of the microlens array are arranged in a stripe shape, similarly to the prisms in Embodiment 1, since uniform illumination light can be easily obtained while preventing the occurrence of the emission line.

Each of the above embodiments is illustrative and not restrictive. The technical scope of the present invention is defined by the claims, and all changes that fall within the range equivalent to the configurations of the claims are also included in the technical scope of the present invention.

For example, in the above explanation, the transparent substrate of the present invention is applied to the transmission-type liquid crystal display device. However, the transparent substrate of the present invention is not limited thereto, but may be applied to various types of liquid crystal display devices such as a reflection type and a semi-transmission type in addition to the transmission type. Moreover, the transparent substrate is used in the illumination device that constitutes a backlight of the liquid crystal display device, and also can be applied to illumination devices that emit planar light having uniform brightness, such as an illuminator for irradiating X-ray radiographs with light or a light box for irradiating negative films or the like with light to facilitate visibility.

In the above explanation, although the glass substrate is used as the substrate body of the transparent substrate, the substrate body of the present invention is not limited thereto. For example, the substrate body may be a transparent synthetic resin with low light absorption properties. Moreover, a transparent substrate made of a synthetic resin can be used instead of the second glass substrate that faces the transparent substrate with the liquid crystal layer sandwiched between them.

In the above explanation, the low refractive index layer that is made of the transparent fluorocarbon resin material and has a refractive index of 1.40 and a thickness of 360 to 920 nm is formed on the substrate body. However, the low refractive index layer of the present invention is not particularly limited as long as the refractive index is lower than that of the substrate body. Specifically, the low refractive index layer may be formed of an organic film that includes a silicon oxide ($SiO_2$ etc.) as the main component, or an inorganic film such as MgF or CaF. The refractive index of the low refractive index layer is preferably close to the refractive index (1.00) of the air. The thickness of the low refractive index layer may be 300 to 1000 nm, and more preferably 500 to 1000 nm, although it should be determined in view of productivity. If the thickness is in this range, reductions in the light utilization efficiency and brightness can be prevented sufficiently almost without causing an increase in tact time or stress crack.

In the above explanation, the high refractive index layer is made of IZO and has a refractive index of 1.90 and a thickness of 130 nm. However, the high refractive index layer of the present invention is not limited thereto, and there is no particular limitation to the material, refractive index, thickness, etc. of the high refractive index layer as long as the refractive index is higher than that of the low refractive index layer.

In the above explanation, the light absorbing layer includes color filters. However, the light absorbing layer of the present invention is not limited thereto, but may be a polarizing layer having higher light absorption properties than the transparent substrate.

In addition to the above explanation, a color filter may be formed on the high refractive index layer as the light absorbing layer by patterning a color resist successively with photolithography.

In the above explanation, the polarizing layer and the reflecting layer are integrated into the polarizing/reflecting plate. However, the reflector of the present invention is not particularly limited as long as it is provided on the opposite side of the substrate body from the surface on which the low refractive index layer is disposed, and reflects light to the substrate body. For example, the reflector can be a reflecting surface formed on the inner surface of a case of the liquid crystal display device that holds the liquid crystal display element. Alternatively, the inner surface of the case may be used as a reflector by applying a silver or white coating with a high light reflectance to the inner surface. Nevertheless, the polarizing/reflecting plate obtained by the combination of the polarizing layer and the reflecting layer is preferred because the reflecting layer and the polarizing layer can be simultaneously incorporated into the illumination device or the liquid crystal display device, and thus the assembly operation of these devices can be easily simplified.

In addition to the above explanation, an optical member such as an optical compensating film for improving the viewing angle properties of the liquid crystal display element may be formed, e.g., on the polarizing layer as needed.

INDUSTRIAL APPLICABILITY

According to the transparent substrate and the illumination device and the liquid crystal display device that use this transparent substrate of the present invention, it is possible to provide a transparent substrate capable of preventing a reduction in the light utilization efficiency, and an illumination device and a liquid crystal display that use the transparent substrate.

The invention claimed is:

1. An illumination device comprising:
   a light source; and
   a transparent substrate comprising a transparent substrate body into which light is introduced through at least one side; a transparent low refractive index layer that is disposed on the substrate body and has a lower refractive index than a refractive index of the substrate body; a transparent high refractive index layer that is disposed on the low refractive index layer and has a higher refractive index than the refractive index of the low refractive index layer; and wherein the low refractive index layer is provided continuously across substantially all of a major surface of the transparent substrate body, and wherein the low refractive index layer has a substantially uniform refractive index across the major surface of the transparent substrate body;
   wherein the light source is located opposite to the side of the substrate body of the transparent substrate,
   a reflector is provided on an opposite side of the substrate body from the surface on which the low refractive index layer is disposed, and
   a light emitting portion is provided on the reflector side of the substrate body and emits the light introduced into the substrate body to the reflector.

2. The illumination device according to claim 1, wherein the transparent substrate is satisfying the following inequality (1):

$$n2<n1<n3 \qquad (1)$$

where n1, n2, and n3 represent the refractive indexes of the substrate body, the low refractive index layer, and the high refractive index layer, respectively.

3. The illumination device according to claim 1, wherein a light absorbing layer with light absorption properties is disposed on the high refractive index layer.

4. The illumination device according to claim 3, wherein the light absorbing layer comprises color filter.

5. An illumination device comprising:
   a light source;
   a transparent substrate comprising: a transparent substrate body into which light is introduced through at least one side; a transparent low refractive index layer that is disposed on the substrate body and has a lower refractive index than a refractive index of the substrate body; and a transparent high refractive index layer that is disposed on the low refractive index layer and has a higher refractive index than the refractive index of the low refractive index layer;

wherein the light source is located opposite to the side of the substrate body of the transparent substrate;
a reflector is provided on an opposite side of the substrate body from the surface on which the low refractive index layer is disposed;
a light emitting portion is provided on the reflector side of the substrate body and emits the light introduced into the substrate body to the reflector; and
wherein the light emitting portion comprises: a transparent film; a plurality of prisms made of a synthetic resin and provided on the transparent film, each prism having an inclined portion; and dielectric thin films bonded to the individual inclined portions so that bonding surfaces of the dielectric thin films and the inclined portions are formed as a plurality of emission surfaces at which the light introduced into the substrate body is emitted to the reflector.

6. The illumination device according to claim 5, wherein the plurality of emission surfaces are inclined at a predetermined angle and equally spaced, and the area of each of the emission surfaces facing the light source is increased gradually with an increase in distance from the light source.

7. The illumination device according to claim 5, wherein the light emitting portion is attached to a surface of the substrate body on the reflector side via a transparent adhesive layer, and
the refractive index of the substrate body, a refractive index of the transparent film, refractive indexes of the prisms, and a refractive index of the adhesive layer are the same or its approximate value.

8. An illumination device comprising:
a light source;
a transparent substrate comprising: a transparent substrate body into which light is introduced through at least one side; a transparent low refractive index layer that is disposed on the substrate body and has a lower refractive index than a refractive index of the substrate body; and a transparent high refractive index layer that is disposed on the low refractive index layer and has a higher refractive index than the refractive index of the low refractive index layer;
wherein the light source is located opposite to the side of the substrate body of the transparent substrate;
a reflector is provided on an opposite side of the substrate body from the surface on which the low refractive index layer is disposed;
a light emitting portion is provided on the reflector side of the substrate body and emits the light introduced into the substrate body to the reflector; and
wherein the light emitting portion comprises: a transparent film; and a microlens array including a plurality of lenses with a convex shape that are provided on the transparent film.

9. The illumination device according to claim 8, wherein the light source is configured using a point light source, and
the plurality of lenses included in the microlens array are arranged radially in a circular arc shape extending from the point light source as a center on the transparent film.

10. The illumination device according to claim 8, wherein the light emitting portion is attached to a surface of the substrate body on the reflector side via a transparent adhesive layer while each of vertices of the lenses included in the microlens array is in contact with the surface of the substrate body on the reflector side, and
the refractive index of the substrate body, a refractive index of the transparent film, a refractive index each of the lenses, and a refractive index of the adhesive layer are the same or its approximate value.

11. The illumination device according to claim 10, wherein the light emitting portion satisfies the following equation (1):

$$h = w^2/(4 \times d) \quad (1)$$

where d represents a thickness of the adhesive layer, h represents a height of each of the lenses from a surface of the transparent film, and a width of each of the lenses is represented by $2w$.

12. The illumination device according to claim 1, wherein the reflector is a polarizing/reflecting plate that comprises a reflecting layer for reflecting light emitted from the light emitting portion back to the light emitting portion and a polarizing layer formed integrally with the reflecting layer.

13. The illumination device according to claim 12, wherein the light emitting portion emits a specific polarized component of the light introduced into the substrate body to the reflector, and
a polarization axis of the polarizing layer is substantially aligned with a direction of polarization of the specific polarized component from the light emitting portion.

14. A liquid crystal display device comprising:
a liquid crystal layer;
a pair of substrates sandwiching the liquid crystal layer, and
the illumination device according to claim 1.

15. A liquid crystal display device comprising a liquid crystal layer and the illumination device of claim 1.

* * * * *